UNITED STATES PATENT OFFICE.

IVAN LEVINSTEIN AND RICHARD HERZ, OF MANCHESTER, ENGLAND, ASSIGNORS TO THE LEVINSTEIN, LIMITED, OF SAME PLACE.

BLUE-BLACK DISAZO COLOR AND PROCESS OF MAKING SAME.

SPECIFICATION forming part of Letters Patent No. 629,748, dated July 25, 1899.

Application filed December 28, 1898. Serial No. 700,574. (Specimens.)

*To all whom it may concern:*

Be it known that we, IVAN LEVINSTEIN, a citizen of the British Empire, and RICHARD HERZ, a citizen of the German Empire, residing at Manchester, in the county of Lancaster, England, have invented certain new and useful Improvements in the Manufacture of Sulfonic Acids of the Naphthalene Series and of Coloring-Matters Therefrom, (patented in Great Britain, No. 12,119, dated May 28, 1898,) of which the following is a full, clear, and exact description.

We have found that a uniform naphthylenediamin sulfonic acid, which is a very valuable raw material for the production of coloring-matters, is formed by the reduction of azo coloring-matters which result from the combination of diazo bodies, preferably of diazobenzene, with the alpha$_1$ naphthylamin beta$_3$ sulfonic acid or alpha$_1$ naphthylamin beta$_4$ sulfonic acid (Clève's acids) or the mixture of them which is obtained by nitration and subsequent reduction of betanaphthalene monosulfonic acid. We have further found that if this naphthylenediamin sulfonic acid is suitably treated with certain acetylating agents, such as acetic acid, one of the amido groups is acetylated, the other remaining free, and that thus monoacetyl-naphthylenediamin sulfonic acids are produced. These sulfonic acids may, however, be produced by reversing the operation—that is to say, the azo coloring-matters which result from the combination of diazo compounds, preferably of diazobenzene, with alpha$_1$ naphthlamin beta$_3$ sulfonic acid or alpha$_1$ naphthylamin beta$_4$ sulfonic acid or the mixture of them obtained by nitration and subsequent reduction of naphthalene betasulfonic acid, may be treated with strong acetylating agents, such as acetic anhydride or acetyl chlorid in the presence of anhydrous sodium acetate, and the thus-produced acetylated azo coloring-matters are reduced, for example, by means of iron and acetic acid in the well-known manner. In the manufacture of coloring-matters from these acetylnaphthylenediamin sulfonic acids we may, for example, proceed as follows: The acetylnaphthylenediamin sulfonic acids are treated with nitrous acid and the resulting diazo compounds combined with amins, diamins, phenols, amidophenols, oxyphenols, both of the benzene and naphthalene series, as well as with their known sulfonic and carboxylic acids, thus forming acetylamidoazo coloring-matters. Of these coloring-matters the following are especially valuable—*i. e.*, the combinations of the diazotised acetylnaphthylenediamin sulfonic acid with rediazotisable amins, amidophenols, amidonaphthols, amidonaphtholethers, and their sulfonic acids—such as paraxylidin, monoacetyl, or mono-oxalyl-metaphenylene, or metatolylenediamin, amidocresol-ether, $\underset{1\ \ 2\ \ \ 4}{(CH_3NH_2OC_2H_5,)}$ alphanaphthylamin, alpha$_1$naphthylamin beta$_3$ or beta$_4$ sulfonic acid, amidonaphthol-ether, or amidonaphthol sulfonic acid gamma. If these latter acetylamidoazo coloring-matters are treated with nitrous acid, the amido group in the rediazotisable amin is diazotised and diazo compounds result which when combined with naphthol sulfonic acids, dioxynaphthalene sulfonic acids, amidonaphthol sulfonic acids, and the like form valuable coloring-matters, which dye vegetable and animal fibers tints varying in shade from blue to black. These coloring-matters still contain the acetylamido group of the acetylnaphthylenediamin sulfonic acid in their molecule. By saponifying them—for example, by heating them with dilute caustic-soda solution—the acetyl group is split off and coloring-matters are obtained which possess a greater intensity and a stronger affinity for vegetable fibers than the original dyestuffs. The shades produced on the fiber by these coloring-matters may be diazotised and developed with suitable developers—such as betanaphthol, metaphenylenediamin, metatolylenediamin, and the like—and thus blue to deep-black colors are produced, which are distinguished by their fastness to milling and to light.

The following examples illustrate in what manner we may carry our invention into practice.

*Example I. Production of alpha$_1$ alpha$_2$ naphthylenediamin beta$_3$ (beta$_4$) sulfonic acid.*

9.3 kilos of anilin is diazotised and the diazobenzene so obtained is combined in the usual manner with 24.5 kilos of the mixed sodium salts of Clève's alpha$_1$ napthylamin beta$_3$- and beta$_4$- sulfonic acids, (as obtained by nitration and subsequent reduction of betanaphthalene sulfonic acid.) The coloring-matter so produced is mixed with water to a thin paste and reduced in the usual manner with thirty kilos of iron borings and two liters of dilute (thirty per cent.) acetic acid. When the reduction is complete, the mass is made alkaline by adding soda or any other suitable alkali, filtered hot from the precipitated iron, and the filtrate made weakly acid. An excess of mineral acid is to be avoided. The alpha$_1$ alpha$_2$ naphthylenediamin beta$_3$-(beta$_4$) sulfonic acid is then crystallized out in fine silver-gray needles, which are nearly insoluble in cold water and only slightly soluble in hot water. Its alkaline salts are very easily soluble in water, and their solutions darken by oxidation on standing in the air.

We do not limit ourselves to the above-described method, as, in the first place, other diazo bodies may be used instead of diazobenzene, and, in the second place, other reducing agents may be employed. We have, however, so far found the hereinbefore-described process effective and economical.

*Example II. Acetylation of the alpha$_1$ alpha$_2$ naphthylenediamin beta$_3$ (beta$_4$) sulfonic acid.*

Fifty kilos of the well-dried and finely-powdered alpha$_1$ alpha$_2$ naphthylenediamin beta$_3$ (beta$_4$) sulfonic acid, obtained as hereinbefore described, is mixed with about fifty kilos of sixty-five-per-cent. acetic acid and thirty kilos of crystallized sodium acetate (CH$_3$COONa.+3Aq.) and the whole mixture is well boiled under a reflux condenser for about from twenty to twenty-five hours. The acetylation is finished if a removed sample is found to be completely soluble in water and diazotisable without decomposition in mineral-acid solution. The mass is then dissolved in water and may be used in the direct production of coloring-matters in the manner hereinbefore described.

*Example III. Production of the monoacetylated alpha$_1$ alpha$_2$ naphtylenediamin beta$_3$ (beta$_4$) sulfonic acid by acetylation and subsequent reduction of azo coloring-matters obtained by the combination of suitable diazo bodies with Clève's alpha$_1$ beta$_3$- or alpha$_1$ beta$_4$-naphthylamin sulfonic acid.*

Step 1. Acetylation of the coloring-matter: Ten kilos of the well-dried and finely-powdered sodium salt, obtained, as described under Example I, from diazo-benzene and the mixtures of Clève's alphanaphthylamin beta sulfonic acids is mixed with ten kilos of glacial acetic acid and ten kilos of acetic anhydride, and the whole mass is heated for some time under a reflux condenser at about 120° centigrade. The reaction is finished when a removed sample dissolves in a dilute soda solution with a pale-yellow color, which changes to a fugitive bluish-red coloration when brought into contact with strong hydrochloric acid on filtering-paper. The whole mass is then dissolved in water, and the acetylated coloring-matter is salted out, filtered off, and pressed. Instead of acetic anhydride a suitable mixture of acetyl chlorid and anhydrous sodium acetate may be used.

Step 2. Reduction of the acetyl coloring-matter: Thirty-five kilos of the pressed acetyl coloring-matter which has been obtained under Step 1 is mixed with water to a thin paste and allowed to gradually run into a boiling mixture of ten kilos of iron borings, one liter of dilute (thirty per cent.) acetic acid, and fifty liters of water. The regenerated anilin may be recovered in the well-known manner by driving it off with steam. When the reduction is finished, the product is made alkaline by adding soda or other suitable alkali and is filtered. The filtrate containing the sodium salt of the acetyldiamin acid can be used direct in the production of coloring-matters in the manner hereinafter described.

*Example IV. Production of coloring-matters from the monoacetyl alpha$_1$ alpha$_2$ naphthylenediamin beta$_3$ (beta$_4$) sulfonic acid by diazotising it, combining the thus-produced diazo body with a diazotisable amin, rediazotising the so-obtained amidoazo body, combining the resulting diazo compound with an aromatic aminphenol, amidophenol, or their sulfonic and carboxylic acids, and finally saponifying the resulting disazo coloring-matters.*

Step 1. Production of the amidoazo coloring-matter: Three hundred and sixty liters of a solution of the sodium salt of the monoacetylalpha$_1$ alpha$_2$ naphthylenediamin beta$_3$ (beta$_4$)-sulfonic acid obtained by one of the hereinbefore-described methods and containing 30.2 kilos of the sodium salt of the acid is cooled by adding ice, acidified by the addition of about twenty to twenty-five liters of strong (thirty per cent.) hydrochloric acid, and diazotised in the usual manner with a solution of 7.2 kilos of sodium nitrite. To this diazo compound a solution of 14.3 kilos of alphanaphthylamin in twelve kilos of hydrochloric acid (21 Baumé) and two hundred and fifty liters of water is added while stirring. After stirring at the ordinary temperature for about twelve hours the excess of mineral acid is removed by adding sodium acetate, and the mixture is further stirred for some hours at a temperature of about 40° centigrade. The insoluble coloring-matter is then filtered off and pressed.

Step 2. Rediazotisation of the amidoazo coloring-matter produced under Step 1 and combination thereof with amidonaphthol sulfonic acid gamma: The pressed cake of coloring-matter produced under Step 1 is made into a thin paste with water and a little ice and is dissolved by adding fifteen liters of thirty-three per cent. caustic-soda solution. To this there is then added a solution containing seven kilos of sodium nitrite, and the liquid is allowed to run slowly, with stirring, into fifty liters of hydrochloric acid mixed with ice. Stirring is continued for from two to three hours, when the diazotisation is complete. The difficultly-soluble diazo compound is then introduced into a soda solution of twenty-five kilos of amidonaphthol sulfonic acid gamma. Care is taken that during the combination the mass is kept alkaline with soda. When the combination is finished, the whole is heated to about 90° centigrade, and the coloring-matter is salted out, filtered, and pressed.

Step 3. Saponification of the acetyl coloring-matter: The pressed coloring-matter resulting from Step 2 is heated with from six to eight times its weight of water to about 90° centigrade, and eighty kilos of solid caustic soda is then added, and the heating is continued, with stirring, for an hour or two, when the saponification is complete. The excess of caustic soda is neutralized with mineral acid, whereby the color is salted out. It is then filtered off, pressed, and dried. It dyes unmordanted cotton a bluish-black, which when diazotised and developed on the fiber with suitable developers—for instance, with betanaphthol or metaphenylenediamin—produces dark-blue to deep-black shades, which are distinguished by their fastness to milling and to light. Analogous dyestuffs are produced if in this example the alphanaphthylamin of Step 1 is replaced by another rediazotisable aromatic amin, amidophenol, amidophenol-ether or their derivatives—as, for example, by alpha$_1$beta$_1$amidonaphthol-ether or alpha$_1$beta$_3$- or alpha$_1$beta$_4$naphthylamin sulfonic acids—also if in Step 3 the amidonaphthol sulfonic acid gamma is replaced by naphthol, dioxynaphthalene or other amidonaphthol sulfonic acids, also if the diazo compound of Example IV, Step 2, instead of being combined with twenty-five kilos of amidonaphthol sulfonic acid gamma is combined with twenty-five kilos of betanaphthol sulfonic acid (Schaeffer) in soda solution and the resulting dyestuff is saponified, a coloring-matter is obtained which dyes unmordanted cotton blue and when diazotised and developed on the fiber with betanaphthol yields bright-blue tints fast to milling and to light.

Having now particularly described and ascertained the nature of our said invention and in what manner the same is to be performed, we declare that what we claim is—

1. The process for the production of bluish-black coloring-matters, which consists in combining Clève's acid with a suitable diazo body, reducing the resulting amidoazo coloring-matter, treating the product with an acetylating agent, diazotising the resulting sulfonic acid, combining the thus-produced diazomonoacetylnaphthylenediamin sulfonic acid with a rediazotisable aromatic amin, rediazotising, combining the resulting diazo compound with an aromatic color component, and finally saponifying the so-formed acetylazo coloring-matter, substantially as described.

2. The process for the production of bluish-black coloring-matters, which consists in combining Clève's acid with a suitable diazo body, reducing the resulting amidoazo coloring-matter, treating the product with an acetylating agent, diazotising the resulting sulfonic acid, combining the thus-produced diazomonoacetylnaphthylenediamin sulfonic acid with a rediazotisable aromatic amin, rediazotising, combining the resulting diazo compound with amidonaphthol sulfonic acid gamma, and finally saponifying the so-formed acetylazo coloring-matter, substantially as described.

3. The process for the production of a bluish-black coloring-matter, which consists in combining Clève's acid with diazobenzene, reducing the resulting amidoazo coloring-matter, treating the product with an acetylating agent, diazotising the resulting sulfonic acid, combining the thus-produced diazomonoacetylnaphthylenediamin sulfonic acid with alpha-naphthylamin, rediazotising, combining the resulting diazo compound with amidonaphthol sulfonic acid gamma, and finally saponifying the so-formed acetylazo coloring-matter, substantially as described.

4. The process for the production of alpha$_1$ alpha$_2$ naphthylenediamin beta$_3$ (beta$_4$) sulfonic acid, which consists in combining Clève's acid with a suitable diazo body, and reducing the resulting amidoazo coloring-matter, substantially as described.

5. The process for the production of monoacetylnaphthylenediamin sulfonic acid, which consists in combining Clève's acid with a suitable diazo body, reducing the resulting amidoazo coloring-matter, and treating it with an acetylating agent, substantially as described.

6. The process for the production of acetylated amidoazo coloring-matters, which consists in combining Clève's acid with a suitable diazo body, reducing the resulting amidoazo coloring-matter, treating it with an acetylating agent, diazotising, and combining the product with a rediazotisable aromatic amin, substantially as described.

7. The process for the production of acetylated disazo coloring-matters, which consists in combining Clève's acid with a suitable diazo body, reducing the resulting amidoazo coloring-matter, treating it with an acetylating agent, diazotising, combining the product with a rediazotisable aromatic amin, rediazotising, and combining the resulting diazo compound with an aromatic color component, substantially as described.

8. As a new article of manufacture, alpha$_1$ alpha$_2$ naphthylenediamin beta$_3$ (beta$_4$) sulfonic acid obtained by combining Clève's acid with a suitable diazo body, and in reducing the resulting amidoazo coloring-matter, having the formula

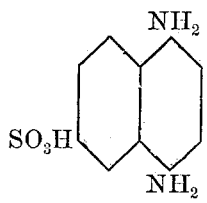

which is readily soluble in soda solution, almost insoluble in water or dilute acid, and which, when treated with sodium nitrite in acetic-acid solution, yields a greenish insoluble diazoamidosulfonic acid, substantially as described.

In witness whereof we subscribe our signatures in presence of two witnesses.

IVAN LEVINSTEIN.
RICHARD HERZ.

Witnesses:
WILLIAM E. HAYS,
ARTHUR MILLWARD.